(12) United States Patent
Hashimura et al.

(10) Patent No.: US 6,663,735 B2
(45) Date of Patent: Dec. 16, 2003

(54) METHOD OF INFLATION USING HOT AIR OR HOT GAS

(75) Inventors: Yoshiaki Hashimura, Hiratsuka (JP); Ichiro Takasu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 31 days.

(21) Appl. No.: 09/904,549

(22) Filed: Jul. 16, 2001

(65) Prior Publication Data

US 2002/0033557 A1 Mar. 21, 2002

(30) Foreign Application Priority Data

Jul. 18, 2000 (JP) .......................... 2000-222407

(51) Int. Cl.[7] .......................... B29D 30/30; B29D 30/36
(52) U.S. Cl. .................. 156/133; 156/130.5; 156/130.7
(58) Field of Search .................. 156/123, 133, 156/130.5, 126, 287, 165, 415, 416, 130.7; 264/512–516, 501, 502, 267–269; 425/31–33, 42

(56) References Cited

U.S. PATENT DOCUMENTS

| | | | | |
|---|---|---|---|---|
| 3,114,968 A | * | 12/1963 | Rudelick | 156/287 |
| 4,595,448 A | * | 6/1986 | Sorioka | 156/416 |
| 5,164,199 A | * | 11/1992 | Fujieda et al. | 425/33 |
| 5,238,643 A | * | 8/1993 | Kobayashi | 264/501 |
| 5,487,411 A | * | 1/1996 | Goncalves | 138/98 |
| 6,228,312 B1 | * | 5/2001 | Boyce | 156/287 |

FOREIGN PATENT DOCUMENTS

| | | | | |
|---|---|---|---|---|
| JP | 56-130316 | * | 10/1981 | 156/165 |

* cited by examiner

*Primary Examiner*—Geoffrey L. Knable
(74) *Attorney, Agent, or Firm*—Arent Fox Kintner Plotkin & Kahn

(57) ABSTRACT

A method of inflation able to prevent peeling of an inner layer in a process of molding accompanied with inflation and deformation, in particular, a method of molding a hollow composite by giving deformation toward an inner surface of at least one composite member so as to cause it to laminate with another composite member, comprising giving the deformation and performing the molding by a pressurizing and heating medium.

6 Claims, 1 Drawing Sheet

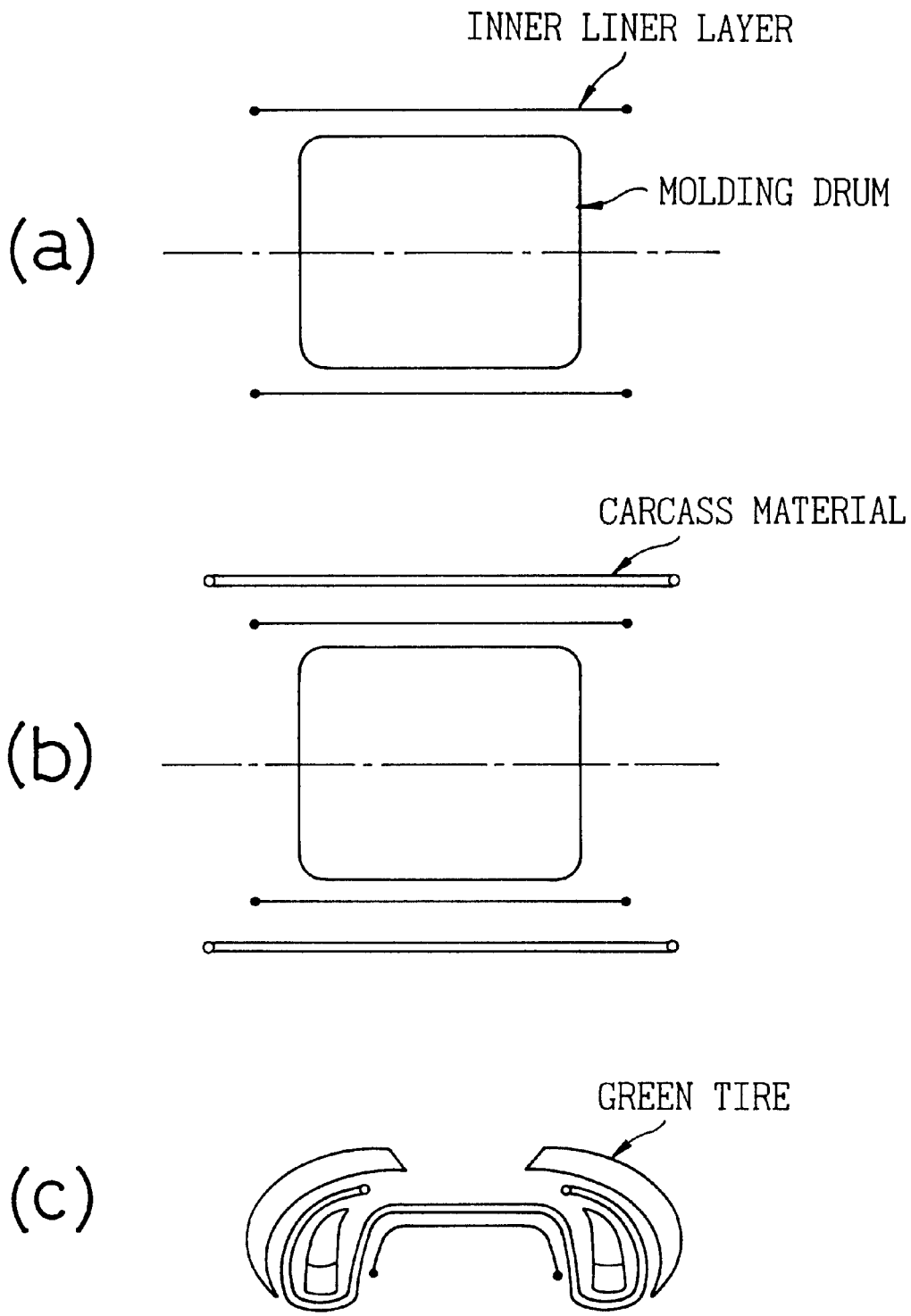

METHOD OF INFLATION USING HOT AIR OR HOT GAS

BACKGROUND OF THE INVENTION

1. Field of the Invention

The present invention relates to a method of inflation by a hot air or a hot gas, more particularly relates to a method of laminate molding wherein at least one composite member is deformed using inflation and a method of forming a composite comprised of at least two layers by deformation.

2. Description of the Related Art

Taking as an example the process of forming a tire, when using a material having a small tackiness and a large shrinkage stress after drawing at the conventional tire carcass material side (for example, a resin film) for the inner liner of the tire, since a gas is filled into the green tire formed by laminating the inner liner layer to the inside of the carcass layer in the shaping process to cause it to inflate and then the pressure is released and since the tackiness between the carcass layer and the inner liner layer is smaller than the peeling force due to the shrinkage stress of the inner liner layer, there was the problem that the inner liner layer ends up peeling off from the carcass layer. In this case, to ensure sufficient tackiness between the carcass layer and the inner liner layer, it is necessary to add a high tackiness rubber layer or cement layer to one or both of the layers or use a high tackiness rubber for the carcass layer. In this case, there is a problem in handling since surfaces with too high a tackiness end up unintentionally bonding when shaping the tire. Further, there is the problem that an inner liner layer having a large rigidity compared with the tackiness cannot be used.

SUMMARY OF THE INVENTION

An object of the present invention is to provide a method of inflation comprising using hot air or a hot gas to apply pressure from an inner surface and simultaneously apply heat from the inner surface in a process of forming involving inflation and deformation so as to heat set the material and weaken its shrinkage stress and thereby prevent peeling.

According to a first aspect of the invention, there is provided a method of molding a hollow composite by giving deformation toward an inner surface of at least one composite member so as to cause it to laminate with another composite member, comprising giving the deformation and performing the molding by a pressurizing and heating medium.

According to a second aspect of the invention, there is provided a method of molding a hollow composite comprising giving deformation and performing the molding simultaneously by giving a force toward an inner surface of a composite comprised of at least two laminated layers using a pressurizing and heating medium.

According to a third aspect of the invention, there is provided a method of forming a tire using a method of molding a hollow composite comprising filling a pressurizing and heating medium in a processing aid hollow member (molding bladder) in which the pressurizing and heating medium can be filled and causing pressurization, heating, and deformation through the processing aid hollow member or filling a pressurizing and heating medium directly inside a hollow of the composite member to be deformed to cause pressurization, heating, and deformation.

BRIEF DESCRIPTION OF THE DRAWINGS

These and other objects and features of the present invention will become more apparent from the following description of the preferred embodiments given with respect to the accompanying drawing.

FIG. 1 is a schematic view of the production of a green tire using the method of inflation of the present invention.

DESCRIPTION OF THE PREFERRED EMBODIMENTS

The inventors discovered that, taking as an example the process of production of a tire, in the case of a green tire obtained by laminating a carcass layer and an inner liner layer (one aspect of a "hollow composite" in the present invention), if, in the process of shaping the tire by filling a rubber molding bladder with a pressurizing gas or directly filling with a pressurizing gas to inflate the green tire, one heats the gas being filled into the molding bladder or heats the molding bladder by a method such as provision of a heating mechanism in the molding bladder, uses that heat to heat the inner liner layer or the carcass layer, and inflates in that state, the material will be heat set in the state expanded by the inflation, so the shrinkage stress will decrease and therefore the force acting to peel off the inner liner layer will fall, thereby solving the problem of peeling of layers. Further, they discovered that, in another mode, even when inflating the green tire directly using a gas without using a molding bladder, a similar action and effect can be obtained by heating the gas to be filled in the green tire so as to heat the inner liner directly.

In working the present invention, as the medium for heating through the above molding bladder (one aspect of the "processing aid hollow member" in the present invention), generally hot air or steam, high temperature water, boiling water, hot nitrogen gas, carbon dioxide gas, etc. may be used. Further, as the medium when heating directly by a medium without the above molding bladder, generally hot air or hot nitrogen gas, carbon dioxide gas, etc. may be used. Further, as other heating means, it is possible to use radiant heat, microwaves, infrared rays, heating coils, and other means to heat the processing aid hollow member (one aspect of being a molding bladder) or heat the pressurizing medium through an intermediate heating medium (for example, a heating cover placed around an infrared lamp). Further, it is possible to use the above means on a supplementary basis at the same time as using a hot gas as the pressurizing and heating medium. In this case, the intermediate heating medium does not have to be used. Further, when heating a green tire using a molding bladder or direct heating medium, since the heating of the green tire results in the temperature of the molding bladder or heating medium falling, it is also possible, according to need, to reheat the molding bladder, supplement the heating medium, or supplement the heating medium and simultaneously recover the medium falling in temperature.

In working the present invention, to secure the holding force for bonding at the time of taking out the tire after it finishes being inflated, it is desirable to cause the temperature of the inner liner layer and the carcass layer to drop to close to ordinary temperature by natural cooling or forced cooling of the filling gas (replacement with low temperature gas). As the forced cooling means, there are, for example, the method of spraying a vaporized substance (for example, steam) on the inner liner layer inside the molding bladder to cool it by evaporation or the method of using a cooling medium such as cooling air, nitrogen gas, carbon dioxide gas, or air mixed in with steam regardless of the use or nonuse of a molding bladder.

Further, the temperature of the surface of the molding bladder or the temperature of the pressurizing medium in working of the present invention may be made 40° C. to 150° C., preferably 40° C. to 80° C. At a temperature higher than 150° C., a rubber material ends up vulcanizing and there is melting of the material due to heat and problems in the safety of the facilities. Further, at a temperature lower than 40° C., the desired action and effect cannot be achieved. Further, the shape should be held for at least 5 seconds or so after pressurization, heating, and inflation. If less than 5 seconds, the material does not sufficiently heat set, so sometimes peels off. Further, when providing a cooling process, the temperature of the cooling medium used to replace the pressurizing and heating medium is preferably about 20° C. lower than the temperature of the heating medium. An ordinary temperature medium is also of course possible. In this case, the above time for holding the inflated shape may be made longer if the cooling can be finished before the other work during the inflation. Further, the pressurizing pressure may be from 5 KPa to 600 KPa according to need, more preferably may be 20 KPa to 300 KPa. If the pressure is too low, the desired amount of inflation is not obtained, while conversely if too high, the amount of deformation becomes too large and the composite sometimes ends up breaking. Further, the pressure does not have to be kept constant and may be adjusted in accordance with need.

The materials used for the composite members of the present invention include ones with high temperature dependencies of the modulus of elasticity and thermoplastic resins, but preferably are ones which easily give the desired effects. In this respect, a thermoplastic elastomer composition comprised of a blend of a thermoplastic resin and an elastomer may be effectively used for the materials.

The material for making a film of a thermoplastic resin or a thermoplastic elastomer composition containing a blend of a thermoplastic resin and an elastomer for use for the inner liner of the tire according to one aspect of the present invention may be any material having an action preventing the permeation of air. As such a thermoplastic resin, for example the following thermoplastic resins may be mentioned:

A polyamide-based resin (for example, Nylon 6 (N6), Nylon 66 (N66), Nylon 46 (N46), Nylon 11 (N11), Nylon 12 (12), Nylon 610 (N610), Nylon 612 (N612), Nylon 6/66 copolymer (N6/66), Nylon 6/66/610 copolymer (N6/66/610), nylon MXD6 (MXD6), Nylon 6T, Nylon 6/6T copolymer, Nylon 66/PP copolymer, or Nylon 66/PPS copolymer) and its N-alkoxyalkylate (for example, a methoxymethylate of 6-Nylon, a methoxymethylate of 6-610-Nylon, and a methoxymethylate of 612-Nylon), a polyester-based resin (for example, polybutylene terephthalate (PBT), polyethylene terephthalate (PET), polyethylene isophthalate (PEI), a PET/PEI copolymer, a polyarylate (PAR), polybutylene naphthalate (PBN), liquid crystal polyester, a polyoxyalkylene diimidic acid/polybutyrate terephthalate copolymer, or other aromatic polyester), a polynitrile-based resin (for example, polyacrylonitrile (PAN), polymethacrylonitrile, acrylonitrile/styrene copolymer (AS), methacrylonitrile/styrene copolymer, methacrylonitrile/styrene/butadiene copolymer), a polymethacrylate-based resin (for example, polymethyl methacrylate (PMMA) or polyethyl methacrylate), a polyvinyl-based resin (for example, vinyl acetate, polyvinyl alcohol (PVA), a vinyl alcohol/ethylene copolymer (EVOH), polyvinylidene chloride (PDVC), polyvinyl chloride (PVC), a vinyl chloride/vinylidene chloride copolymer, a vinylidene chloride/methyl acrylate copolymer, or a vinylidene chloride/acrylonitrile copolymer), a cellulose-based resin (for example, cellulose acetate or cellulose acetate butyrate), a fluororesin (for example, polyvinylidene fluoride (PVDF), polyvinylfluoride (PVF), polychlorofluoroethylene (PCTFE), or a tetrafluoroethylene/ethylene copolymer), an imide-based resin (for example, aromatic polyimide (PI)), etc. may be mentioned.

Further, a thermoplastic elastomer composition containing a blend of the above thermoplastic resin and an elastomer may be obtained by mixing an elastomer into the above thermoplastic resin. It is not limited in type of material or ratio of mixture etc. so long as it has an action of preventing permeation of air.

As an elastomer able to be blended with the above thermoplastic resin, for example the folllowing may be mentioned:

A diene-based rubber and its hydrogenated rubber (for example, NR, IR, epoxylated natural rubber, SBR, BR (high cis BR and low cis BR), NBR, hydrogenated NBR, or hydrogenated SBR), an olefin-based rubber (for example, an ethylene propylene rubber (EPDM, EPM), maleic-acid modified ethylene propylene rubber (M-EPM), IIR, an isobutylene-aromatic vinyl/diene-based monomer copolymer, acryl rubber (ACM), or an ionomer), a halogen-containing rubber (for example, Br-IIR, Cl-IIR, a bromide of an isobutylene-p-methylstyrene copolymer (Br-IPMS), chloroprene rubber (CR), hydrin rubber (CHR), chlorosulfonated polyethylene (CSM), chlorinated polyethylene (CM), or maleic-acid modified chlorinated polyethylene (M-CM)), a silicone rubber (for example, methylvinyl silicone rubber, dimethyl silicone rubber, or methylphenylvinyl silicone rubber), a sulfur-containing rubber (for example, polysulfide rubber), a fluororubber (for example, a vinylidene fluoride-based rubber, fluorine-vinylether-based rubber, tetrafluoroethylene-propylene-based rubber, fluorine-containing silicone-based rubber, fluorine-containing phosphazene-based rubber), a thermoplastic elastomer (for example, a styrene-based elastomer, olefin-based elastomer, ester-based elastomer, urethane-based elastomer, or polyamide-based elastomer), etc. may be mentioned.

The method of production of the thermoplastic elastomer composition comprises melt kneading a thermoplastic resin component and elastomer component (in the case of rubber, unvulcanized) in a twin-screw kneading extruder etc. to disperse the elastomer component as a dispersion phase (domain) in a continuous phase (matrix) formed by the thermoplastic resin. When vulcanizing the elastomer, it is possible to add a vulcanizing agent while kneading and dynamically vulcanize the elastomer composition. Further, the various compounding agents (except the vulcanizing agent) may be added to the thermoplastic resin or the elastomer component during the above kneading, but it is preferable to mix them in advance before kneading. The kneader used for kneading the thermoplastic resin and the elastomer component is not particularly limited, but a screw extruder, a kneader, a Banbury mixer, a twin-screw kneading extruder, etc. may be used. Among these, use of a twin-screw kneading extruder is preferable for kneading the thermoplastic resin and elastomer component and for dynamic vulcanization of the elastomer component. Further, it is possible to use two or more types of kneaders for successive kneading. The condition for the melt kneading is a temperature of at least the temperature at which the thermoplastic resin melts. Further, the shear rate at the time of kneading is preferably 1000 to 7500 $sec^{-1}$. The overall kneading time is from 30 seconds to 10 minutes. Further, when adding a vulcanizing agent, the vulcanization time after addition is preferably from 15 seconds to 5 minutes.

When the above specific thermoplastic resin and elastomer component differ in compatibility, it is preferable to make the two compatible by using a suitable compatibilizer as a third component. By mixing a compatibilizer into the system, the interface tension between the thermoplastic resin and the elastomer falls and as a result the particle size of the rubber forming the dispersed phase becomes smaller, so the characteristics of the two components are more effectively manifested. As such a compatibilizer, a copolymer having the structure of one or both of the thermoplastic resin and elastomer component, or something having the structure of a copolymer having an epoxy group, carbonyl group, halogen group, amino group, oxazoline group, hydroxy group, etc. able to react with the thermoplastic resin or elastomer component may be used. This may be selected in accordance with the type of the thermoplastic resin and elastomer component to be mixed, but usually a styrene-ethylene-butylene block copolymer (SEBS) or its maleic-acid modified form, EPDM, EPDM-styrene, or an EPDM-acrylonitrile graft copolymer or its maleic-acid modified form, a styrene-maleic acid copolymer, reactive phenoxy, etc. may be used. The amount of the compatibilizer blended is not particularly limited, but is preferably 0.5 to 10 parts by weight with respect to 100 parts by weight of the polymer component (total of the thermoplastic resin and elastomer component).

The ratio of the specific thermoplastic resin component (A) and elastomer component (B) when blending a thermoplastic resin and elastomer is not particularly limited and may be suitably determined by the desired Young's modulus and thickness of the molded article, but the preferable range is 90/10 to 30/70.

In addition to the above essential polymer component, the above compatibilizer polymer and other polymers may be mixed into the polymer composition according to the present invention to an extent not detracting from the required characteristics of the tire use polymer composition of the present invention. The objectives for mixing these other polymers include improving the compatibility between the thermoplastic resin and elastomer component, improving the moldability of the shaped article of the material, improving the heat resistance, and reducing the cost. As the material used, for example, polyethylene (PE), polypropylene (PP), polystyrene (PS), ABS, SBS, polycarbonate (PC), etc. may be mentioned. It is also possible to blend into the polymer composition of the present invention agents generally blended into polymer formulations such as a filler (calcium carbonate, titanium oxide, alumina, etc.), carbon black, white carbon, and other reinforcing agents, a softening agent, plasticizer, processing aid, pigment, dye, antioxidant, etc. so far as the requirements of the air barrier property and Young's modulus are not impaired.

Further, the above elastomer component may be dynamically vulcanized when mixing it with the thermoplastic resin. The vulcanizing agent, vulcanization aid, vulcanization conditions (temperature and time), etc. when dynamically vulcanizing the elastomer component may be suitably determined in accordance with the composition of the elastomer component added and are not particularly limited.

As the vulcanizing agent, it is possible to use a general rubber vulcanizing agent (cross-linking agent). Specifically, a sulfur-based vulcanizing agent such as powdered sulfur, precipitated sulfur, high dispersion sulfur, surface-treated sulfur, insoluble sulfur, dimorpholine disulfide, alkylphenol disulfide, etc. may be mentioned. For example, this may be used in an amount of about 0.5 to 4 phr (parts by weight per 100 parts by weight of the rubber component (polymer)).

Further, as an organic peroxide-based vulcanizing agent, benzoyl peroxide, t-butyl hydroperoxide, 2,4-bichlorobenzoyl peroxide, 2,5-dimethyl-2,5-di(t-butylperoxy)hexane, 2,5-dimethylhexane-2,5-di (peroxybenzoate), etc. may be mentioned. For example, this may be used in an amount of about 1 to 20 phr.

Further, as a phenol resin-based vulcanizing agent, a bromide of an alkylphenol resin or a mixed cross-linking system containing stannous chloride, chloroprene, or other halogen donor and an alkylphenol, etc. may be mentioned. For example, this may be used in an amount of about 1 to 20 phr.

In addition, zinc oxide (about 5 phr), magnesium oxide (about 4 phr), litharge (about 10 to 20 phr), p-quinonedioxime, p-dibenzoylquinonedioxime, tetrachloro-p-benzoquinone, poly-p-dinitrosobenzene (about 2 to 10 phr), and methylene dianiline (about 0.2 to 10 phr) may be mentioned.

Further, if necessary, a vulcanization accelerator may also be added. As the vulcanization accelerator, it is possible to use an aldehyde-ammonia type, a guanidine type, a thiazole type, a sulfenamide type, a thiuram type, a dithio acid salt type, a thiourea type, or other general vulcanization accelerator in an amount of for example 0.5 to 2 phr.

Specifically, as an aldehyde-ammonia based vulcanization accelerator, it is possible to mention hexamethylene tetraamine etc., as a guanidine-based vulcanization accelerator, it is possible to mention diphenyl guanidine etc., as a thiazole-based vulcanization accelerator, it is possible to mention dibenzothiazyl disulfide (DM), 2-mercaptobenzothiazole and its Zn salt, cyclohexylamine salt, etc., as a sulfenamide-based vulcanization accelerator, it is possible to mention cyclohexylbenzothiazyl sulfenamide (CBS), N-oxydiethylenebenzothiazyl-2-sulfenamide, N-t-butyl-2-benzothiazole sulfenamide, 2-(thymolpolynyldithio)benzothiazole, etc., as a thiuram-based vulcanization accelerator, it is possible to mention tetramethylthiuram disulfide (TMTD), tetraethylthiuram disulfide, tetramethylthiuram monosulfide (TMTM), dipentamethylenethiuram tetrasulfide, etc., as a dithio acid salt-based vulcanization accelerator, it is possible to mention Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamaate, Fe-dimethyldithiocarbamate, pipecolinepipecolyldithiocarbamate, etc., and as a thiuram-based vulcanization accelerator, it is possible to mention ethylene thiourea, diethyl thiourea, etc.

Further, as an accelerator activator, it is possible to use a general rubber aid together. For example, it is possible to use zinc oxide (about 5 phr), stearic acid or oleic acid and their Zn salts (about 2 to 4 phr) etc.

The thus obtained film has the structure of a matrix of a thermoplastic resin in which an elastomer is dispersed as a discontinuous phase. Due to this structure, it is possible to impart sufficient flexibility to the film and impart sufficiently low air permeability due to the effect of the resin layer of the continuous phase and possible to obtain a moldability of the thermoplastic resin without regard as to the amount of the elastomer.

In particular, in the case of a tire, when using this thermoplastic elastomer composition for the inner liner material, even a material with a small tackiness with the carcass material is heat set after inflation and has less shrinkage, so the inner liner material no longer peels off. Further, it is possible to add an adhesive or cement layer for suitably supplementing the tackiness to at least part of the inner liner layer of the thermoplastic elastomer composition or adjoining layers. Note that the adhesive is not particularly limited. It is possible to use any in general use in the past in a thickness of for example about 1 µm to 100 µm. This adhesive facilitates the work at the time of shaping since it has tackiness and is cross-linked by the heat at the time of vulcanization so acts to make the thermoplastic elastomer composition strongly bond with other members.

The adhesive is preferably an adhesive composition including a polymer component having a critical surface tension difference ($\Delta\gamma c$) with the surface polymer component of the thermoplastic elastomer composition and the rubber component of the adjoining members of not more than 6 mN/m, preferably not more than 3 mN/m. The polymer forming the main component of the adhesive may be a general unvulcanized rubber, an acrylic acid ester copolymer, a polyether and polyester polyol, a styrene copolymer, modified styrene copolymer, polyolefin, etc., specifically, natural rubber, SBR, BR, IR, EPDM, or other unvulcanized rubber, butyl acrylate, 2-ethylhexyl acrylate, ethyl acrylate, or other polymer obtained by polymerization of a monomer and copolymers of these with ethylene, polypropylene glycol, polyethylene glycol, polytetramethylene glycol, a condensate of adipic acid and glycol and triol, that is, ethylene adipate, butylene adipate, or diethylene adipate, a styrene ethylene butylene copolymer, a styrene ethylene propylene copolymer, and modified forms of the above giving an epoxy group, carboxyl group, amino group, anhydrous maleic acid group, etc.

As the vulcanizing agent, in addition to a general rubber use vulcanizing agent, it is possible to freely select an isocyanate-based vulcanizing agent, an amine-based vulcanizing agent, etc. in accordance with the type of polymer. Specifically, a sulfur-based agent such as powdered sulfur, precipitated sulfur, high dispersion sulfur, surface-treated sulfur, insoluble sulfur, dimorpholine disulfide, alkylphenol disulfide, etc. in amounts of for example about 1 to 4 phr (parts by weight per 100 parts by weight of rubber, same below), a peroxide-based agent such as benzoyl peroxide, t-butyl hydroperoxide, 2,4-dichloro dibenzoyl peroxide, 2,5-dimethyl-2,5-di(t-butylperoxy)hexane, 2,5-dimethyl hexane-2,5-di(peroxybenzoate), etc. in amounts of for example about 1 to 15 phr, and zinc oxide (about 5 phr), magnesium oxide (about 4 phr), litharge (about 10 to 20 phr), p-quinonedioxime, p-dibenzoylquinone dioxime, tetrachloro-p-benzoquinone, poly-p-dinitrosobenzene (about 2 to 10 phr), etc. may be mentioned.

As the isocyanate component, it is possible to use any which is cross-linked by the heat at the time of vulcanization. Specifically, it is possible to mention TDI, MDI, crude MDI, NDI, HDI, IPDI, etc. The ratio of blending of the polyester polyol and isocyanate is preferably in the range of an index (—NCO/—OH×100=) 50 to 200. This is because outside of this range, the adhesion is poor and the bonding falls and the thermoplastic film and adjoining members are no longer joined.

As the vulcanization accelerator, a general rubber vulcanization accelerator may be used in an amount of for example 0.5 to 2 phr. Specifically, as an aldehyde-ammonia based vulcanization accelerator (for example, hexamethylene tetraamine), a guanidine-based vulcanization accelerator (for example, diphenyl guanidine), a thiazole-based vulcanization accelerator (for example, 2-mercaptobenzothiazole and its Zn salt, cyclohexylamine salt, and dibenzothiazyl disulfide), a sulfenamide-based vulcanization accelerator (for example, cyclohexylbenzothiazylsulfenamide, N-oxydiethylenebenzothiazyl-2-sulfenamide, N-t-butyl-2-benzothiazolesulfenamide, and 2-(thymolpolynyldithio) benzothiazole), a thiuram-based vulcanization accelerator (for example, tetramethylthiuram disulfide, tetraethylthiuram disulfide, tetramethylthiuram monosulfide, and dipentamethylenethiuram tetrasulfide), a dithio acid salt-based vulcanization accelerator (for example, a Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamaate, Fe-dimethyldithiocarbamate, and picolinepipecolyldithiocarbamate), a thiuram-based vulcanization accelerator (for example, ethylene thiourea and diethyl thiourea), etc. may be mentioned.

When the adhesiveness of the adhesive is insufficient, it is possible to add a tackifier.

As the tackifier, it is possible to use any used for a general adhesive, bond, etc. in an amount of for example about 10 to 100 phr. Specifically, (a) a rosin-based resin (gum rosin, tall oil rosin, wood rosin, or other rosin; hydrogenated rosin, disproportionated rosin, polymerized rosin, maleate rosin, or other basic rosin), rosin glycerin ester (ester gum), hydrogenated rosin-glycerin ester, and other rosin esters and (b) a terpenephenol resin or other resin having a polar group or a resin not having a polar group, for example, an α-pinene-based, β-pinene-based, dipentene (limonen)-based or other terpene resin and an aromatic hydrocarbon modified terpene resin or other natural substance and its derivative and for example (c) an aliphatic, alicyclic, aromatic, or other petroleum resin; (d) a coumarin-indene resin, (e) a styrene-based, substituted styrene-based, or other styrene-based resin, or other polymer-based resin, or (f) an alkylphenol resin, rosin-modified phenol resin, or other phenol-based resin, and (g) a xylene resin or other condensate-based resin may be mentioned.

As other components, when it is necessary to raise the bonding strength, it is possible to partially mix into the adhesive composition an additive reacting with the film material or the rubber material facing the film material or an additive having a critical surface tension closer to the film material or rubber material facing the film material. When using a nylon-based resin as the thermoplastic film material, it is possible to use a resorcin formalin resin, glycoluryl resin, etc. as the additive. Further, when using a polyester-based resin, it is possible to use an isocyanate etc. The amount of the additive blended is preferably 0.5 to 10 parts by weight with respect to 100 parts by weight of the polymer component.

Further, when desiring to add color, it is possible to blend in carbon or a coloring agent etc.

The adhesive of the present invention may be dissolved in advance in a solvent etc. and used to form an adhesive layer simply by the method of coating it on the bonding surface by a brush, spray, roller, etc., or the method of depositing it on a thermoplastic film by a dip roller coater, kiss roller coater, knife coater, etc. As a method not using a solvent, it is possible to coextrude it at the time of forming the thermoplastic film or laminate it to form a two-layer film.

As the solvent when making a solvent-based adhesive, it is possible to use a general solvent. As specific examples, an aromatic solvent (benzene, toluene, xylene, etc.), an aromatic and aliphatic mixture (MSP, SBP, Swazole 100, Swazole 200, Benzol Arrow 40 HAWS, White Spirit, etc.), an aliphatic ester (rubber gasoline, ethyl acetate, etc.), an alcohol ketone (methanol, acetone, methylethylketone, methylisobutylketone), etc. may be mentioned. The specific solvent may be selected from these solvents in accordance with the evaporation rate. These solvents may be used mixed in combinations of two or more types. The amount of addition of the solvent may be determined in accordance with the viscosity as the adhesive.

The method of molding of the present invention can be made effective use of as a technique for strongly lining the inside of a hollow member of a predetermined shape or a tubular member, etc. with a thermoplastic film or sheet, so for example can be effectively used for an inner liner of a tank, a hose, fender, etc. in addition to a tire.

As an example of application to a pneumatic fender of an example of application to forming a hollow composite, a paper or other removable material is used to prepare a molding form corresponding to the inside shape of the expected bag member as a core material, a rubber layer and reinforcing rubber layer are wrapped around the surface of the molding form to form a hollow composite, the molding form is removed by melting or peeling it off, then for example a bag member of a thermoplastic elastomer composition comprised of a blend of a thermoplastic resin and elastomer is inserted into the cavity inside the hollow composite. Next, a hose or other path for filling a pressurizing medium is provided in part of the bag member and hot air or another pressurizing and heating medium is filled inside the bag member through this path to press the bag member against the inside of the rubber composite to heat set it. Further, the pressure is released after a sufficient cooling time when necessary. By this, peeling off of the bag member after pressure is released is prevented.

As another example of application to a pneumatic fender, an unvulcanized rubber layer or reinforcing cord layer is laid over the inner surface of a removable metal mold having a shape corresponding to the outer shape of the fender at its inner surface, a bag member of for example a thermoplastic elastomer composition comprised of a blend of a thermoplastic resin and elastomer is inserted into it, and a heating and pressurizing medium is filled inside the bag member from part of the bag member to press and laminate the bag member against the inside of the rubber composite layer and heat set it to prevent peeling off after release of the pressure.

Further, it is also possible to laminate for example a thermoplastic elastomer composition comprised of a blend of a thermoplastic resin and elastomer on a molding form serving as core, laminate a rubber layer or reinforcing rubber layer over this to form a double layer, then fill hot air or another pressurizing and heating medium inside it to bond and heat set the rubber layer and thermoplastic elastomer composition. In this case, it is also possible to press the composition against a mold prepared in advance at the outside and having the shape of the product in its inner surface.

In both cases, it is sufficient to give an adhesive layer for supplementing the tackiness to at least the adjoining layer side of a laminate member of the thermoplastic elastomer composition etc.

Further, these methods are not applicable only to the method of molding a pneumatic fender and may of course also be applied to the production of hoses or tanks.

Further, in each of the above methods of molding, the inflation of the hollow composite by the pressurizing and heating medium may be performed either before the vulcanization or after the vulcanization of the applied material.

Further, as an example of application to for example a tire as an example of application to a hollow composite, a green hollow composite (green tire) obtained by laminating a side tread, bead wire, and bead filler on a carcass material, then combining a belt, tread, etc. is vulcanized without coating a release agent on its inner surface or is coated with a release agent, vulcanized, then cleaned of the release agent on the inner surface by washing or shaving it off, a thermoplastic resin or a thermoplastic elastomer composition comprised of a blend of a thermoplastic resin and elastomer of a cylindrical shape or bag shape is inserted as a cylindrical shape or bag shape to the inner surface of the vulcanized tire, then a pressurizing and heating medium is filled inside or a bladder is provided and a heating and pressurizing medium is filled inside it so as to give heat and facilitate deformation and cause inflation, then heat is transmitted to the tire side at the portions touching the outside vulcanized tire and the portions are cooled and heat set so as to bond them to the inner surface of the vulcanized tire.

Below, the present invention will be explained further with reference to examples and comparative examples, but the technical scope of the present invention is of course not limited to these examples.

EXAMPLES 1 TO 7 AND COMPARATIVE EXAMPLES 1 TO 5

In the examples of the present invention, examples of application of the method of molding of the present invention to when providing an inner liner layer at the inside layer of the carcass layer of a tire are shown.

Method of Shaping Tire

A resin film mainly comprised of a thermoplastic resin was arranged on the surface of a shaping drum as an inner liner layer as shown in FIG. 1a, a belt-shaped carcass material comprised of carcass cord and a coat rubber was wrapped around this (FIG. 1b), and bead members or side wall members etc. were suitably attached to obtain a green tire (one aspect of hollow composite) (sectional shape of FIG. 1c). Next, the bead members were sealed and ordinary temperature or hot air was filled as a pressurizing medium into the green tire to inflate the green tire. Further, the inner pressure was held for a while, then the pressurizing medium was suitably replaced by a cooling medium (air or nitrogen gas). Alternatively, the tire was shaped while not replacing it.

Tire Material

A green tire of a steel radial tire (size 185/65R14) was prepared using a thermoplastic elastomer film comprised of the inner liner layer material A and an adhesive shown below.

Innermost Layer (Inner Liner Layer) Material A 13 parts by weight (parts by weight per 100 parts by weight of rubber, same below) of Nylon 6,66 copolymer (Toray Amilan CM6041), 25 parts by weight of Nylon 11 (Atochem Rilsan BMNO), and 50 parts by weight of Br-(polyisobutylene-p-methylstyrene) (EXXPRO89-4, Exxon Chemical) were mixed by a twin-screw kneader to disperse the rubber in the resin component, ZnO, zinc stearate, and stearic acid were added in amounts of 0.3 part by weight, 1.2 parts by weight, and 0.6 part by weight, dynamic vulcanization was performed, then the result was pelletized. This was extruded by a T-die to form a film of a thickness of 0.1 mm.

| Adhesive Used | Part by Weight |
|---|---|
| EEA (ethylene-ethyl acrylate copolymer) DPDJ-6169 (Unicar Japan) | 100 |

-continued

| Adhesive Used | Part by Weight |
|---|---|
| Quinton A-100 (Nippon Zeon) | 60 |
| Dicumyl peroxide | 1 |
| FEF Black | 10 |
| Toluene | 400 |
| MEK | 100 |
| n-hexane | 100 |

A composition of EEA, Quinton A-100, and FEF Black was mixed by the above formulation and stirred by a homogenizer (speed of 8000 rpm) in a mixed solvent of toluene etc. to make an adhesive. Finally, dicumyl peroxide was added and stirred. This adhesive was coated on the carcass layer side of the innermost layer comprised of the material A.

The results are shown in Tables 1 and 2 below.

TABLE 1

(Tire size: 185/65R14)

|  | Comp. Ex. 1 | Comp. Ex. 2 | Ex. 1 | Ex. 2 | Ex. 3 | Ex. 4 | Comp. Ex. 3 |
|---|---|---|---|---|---|---|---|
| Outer layer | Carcass layer | Carcass layer | Carcass layer | Carcass layer | Carcass layer | Carcass layer | Carcass layer |
| Lift (max.) of innermost layer | 60% | 60% | 60% | 60% | 60% | 60% | 60% |
| Material of innermost layer *1 | Material A | Material A | Material A | Material A | Material A | Material A | Material A |
| Thickness of innermost layer (mm) | 0.1 | 0.1 | 0.1 | 0.1 | 0.1 | 0.1 | 0.1 |
| Use of molding bladder | No | No | No | No | No | No | No |
| Inner pressure at pressurization (kPa) | 100 | 100 | 100 | 100 | 100 | 100 | 100 |
| Type of pressurizing medium | Air | Air | Air | Air | Air | Air | Air |
| Temperature of pressurizing medium (° C.) | 25 | 35 | 45 | 75 | 85 | 145 | 160 |
| Inner pressure holding time of pressurizing medium (sec) | 20 | 20 | 20 | 20 | 20 | 20 | 20 |
| Type of cooling medium | None | None | None | None | None | None | None |
| Temperature of cooling medium (° C.) | — | — | — | — | — | — | — |
| Inner pressure holding time after replacement by cooling medium (sec) | — | — | — | — | — | — | — |
| Total inner pressure holding time *2 (sec) | 25 | 25 | 25 | 25 | 25 | 25 | 25 |
| Peeling of inner surface layer after molding *3 | Yes | Yes | No | No | No | No | No |
| Remarks |  |  |  |  |  |  | Part of innermost layer melts out |

Notes:
*1 Material A: Thermoplastic resin elastomer composition
*2 Total inner pressure holding time: In the case of no cooling medium, the time from the start of pressurization to when the tire is detached. In the case of a cooling medium, the total time from the start of pressurization through the replacement and removal of the cooling medium to when the tire is detached.
*3 Method of confirmation of peeling: Visual confirmation of peeling of inner surface after release of pressure and standing for 5 minutes.

TABLE 2

(Tire size: 185/65R14)

|  | Comp. Ex. 1 | Comp. Ex. 4 | Ex. 5 | Ex. 6 | Comp. Ex. 5 | Ex. 7 |
|---|---|---|---|---|---|---|
| Outer layer | Carcass layer | Carcass layer | Carcass layer | Carcass layer | Carcass layer | Carcass layer |
| Lift (max.) of innermost layer | 60% | 60% | 60% | 60% | 60% | 60% |
| Material of innermost layer *1 | Material A | Material A | Material A | Material A | Material A | Material A |
| Thickness of innermost layer (mm) | 0.1 | 0.1 | 0.1 | 0.1 | 0.1 | 0.1 |
| Use of molding bladder | No | No | No | No | No | Yes |
| Inner pressure at pressurization (kPa) | 100 | 100 | 100 | 100 | 100 | 100 |
| Type of pressurizing medium | Air | Air | Air | Air | Air | Air |
| Temperature of pressurizing medium (° C.) | 25 | 45 | 45 | 45 | 80 | 120 |
| Inner pressure holding time of pressurizing medium (sec) | 20 | 20 | 20 | 20 | 3 | 5 |
| Type of cooling medium | None | Air | Air | $N_2$ gas | None | None |

TABLE 2-continued (Tire size: 185/65R14)

| Outer layer | Comp. Ex. 1 Carcass layer | Comp. Ex. 4 Carcass layer | Ex. 5 Carcass layer | Ex. 6 Carcass layer | Comp. Ex. 5 Carcass layer | Ex. 7 Carcass layer |
|---|---|---|---|---|---|---|
| Temperature of cooling medium (° C.) | — | 30 | 20 | 50 | — | — |
| Inner pressure holding time after replacement by cooling medium (sec) | — | 5 | 5 | 5 | — | — |
| Total inner pressure holding time *2 (sec) | 25 | 30 | 30 | 30 | 25 | 25 |
| Peeling of inner surface layer after molding *3 | Yes | Yes | No | No | Yes | No |
| Remarks | | When temperature of cooling medium exceeds 30° C., holding force became insufficient and peeling occurred. | | | With pressurizing and heating time of less than 5 sec, material was not heat set, so peeling occurred. | |

Notes:
*1: Material A: Thermoplastic resin elastomer composition
*2: Total inner pressure holding time: In the case of no cooling medium, the time from the start of pressurization to when the tire is detached. In the case of a cooling medium, the total time from the start of pressurization through the replacement and removal of the cooling medium to when the tire is detached.
*3: Method of confirmation of peeling: Visual confirmation of peeling of inner surface after release of pressure and standing for 5 minutes.

According to the results of Tables 1 and 2, in the examples of the present invention, so long as the conditions of the present invention are followed, peeling of the inner surface layer (inner liner layer) did not occur.

Example of Pneumatic Fender

An unvulcanized rubber layer and reinforcing cord layer were laid over the inner surface of a metal mold having an inside shape corresponding to the outer shape of a bag to prepare a hollow composite. A bag member comprised of a double layer of a thermoplastic elastomer composition comprised of a blend of the following thermoplastic resin and an elastomer and of an adhesive and having one end connected to the outside by a hose was inserted into the cavity inside this composite, air of a pressure of 400 kPa changed in temperature between 25° C. and 60° C. was filled into the bag member by the hose to press the bag member against the inner surface of the composite, the pressure was released after 5 minutes, then the presence of peeling of the thermoplastic elastomer layer at the inside was observed.

As a result, when making the temperature of the air being filled 25° C., there was partial peeling between the unvulcanized rubber layer and the adhesive layer, but when making it 60° C., the thermoplastic elastomer composition was heat set, so the peeling force was suppressed and no peeling occurred.

Summarizing the effects of the invention, from the above results, it is clear that according to the method of inflation of the present invention, it is possible to effectively prevent peeling between layers.

While the invention has been described with reference to specific embodiment chosen for purpose of illustration, it should be apparent that numerous modifications could be made thereto by those skilled in the art without departing from the basic concept and scope of the invention.

What is claimed is:

1. A method of forming a green tire, in which said method comprises forming a hollow composite comprising an inner layer composed of a thermoplastic resin or a blend of thermoplastic resin and an elastomer laminated to an inner surface of a carcass, with or without adhesive, and then shaping the hollow composite using a pressurizing and heating medium at a temperature of 40–150° C. and a pressure of 5–600 Kpa, to form the green tire.

2. A method for forming a green tire as set forth in claim 1, in which the pressurizing and heating medium is air and/or an inert gas.

3. A method of forming a green tire as set forth in claim 1, in which the carcass is arranged over at least part of the inner layer of said hollow composite.

4. A method of forming a green tire as set forth in claim 1, in which the pressurizing and heating medium is injected into the cavity of the hollow composite through a processing aid hollow member.

5. A method of forming a green tire as set forth in claim 1, in which the method of claim 1, further comprises a cooling step in which a cooling medium is injected into the cavity of the hollow composite and replacing the pressurizing and heating medium with the cooling medium.

6. A method of forming a green tire as set forth in claim 5, in which the temperature of the cooling medium used to replace the pressurizing and heating medium is at least 20° C. lower than the temperature of the pressurizing and heating medium.

* * * * *